United States Patent [19]

Liu

[11] Patent Number: 5,588,563
[45] Date of Patent: Dec. 31, 1996

[54] QUANTITATIVE DISPENSER

[76] Inventor: Chin-Ching Liu, No. 25, Lane 16, Tunghsing St., Shu-Lin Town, Taipei Hsien, Taiwan

[21] Appl. No.: 540,265

[22] Filed: Oct. 6, 1995

Related U.S. Application Data

[63] Continuation-in-part of Ser. No. 328,193, Oct. 21, 1994, abandoned.

[51] Int. Cl.⁶ .................................................... G01F 11/46
[52] U.S. Cl. ........................ 222/158; 222/438; 222/450
[58] Field of Search ............................... 222/158, 424.5, 222/425, 434, 435, 438, 439, 450, 451, 452, 543

[56] References Cited

U.S. PATENT DOCUMENTS

| | | | |
|---|---|---|---|
| 1,993,329 | 3/1935 | Johnson | 222/450 |
| 2,339,644 | 1/1944 | Lucas | 222/425 |
| 2,815,154 | 12/1957 | Smith | 222/452 |
| 2,877,937 | 3/1959 | Weir | 222/452 |
| 2,887,254 | 5/1959 | Menderman | 222/450 |
| 2,985,343 | 5/1961 | Mask | 222/450 X |
| 3,005,578 | 10/1961 | Mainieri | 222/450 |
| 3,179,303 | 4/1965 | Dankoff et al. | 222/438 X |
| 3,201,009 | 8/1965 | Smith | 222/452 X |
| 3,207,371 | 9/1965 | Stone | 222/452 X |
| 3,424,355 | 1/1969 | Blumen | 222/450 |
| 4,174,058 | 11/1979 | Bassignani | 222/438 |
| 4,345,700 | 8/1982 | Souza | 222/452 X |
| 4,429,815 | 2/1984 | Libit | 222/452 |

*Primary Examiner*—Kevin P. Shaver
*Attorney, Agent, or Firm*—Pro-Techtor International Services

[57] ABSTRACT

A quantitative dispenser including a cylindrical body with a bottom. A separator plate is engaged in an inner annular slot on the top of the cylindrical body. The separator plate has a central engaging hole and a flow-through opening. A cover is engaged over the outer periphery of said body. The cover has an outlet with a sealing cap and engages the separator plate. A scale divider has a sleeve part and a wing part. The sleeve part is slipped on a hollow engaging shaft and the wing part is able to be fixed as a way to form a measuring scale on the inner periphery of the cover. A scale is provided on an outer surface of said cover. The powdered milk stored in the body can pass through the flow-through opening on the periphery of the separator plate into a measuring space. The powder is then dispensed through an outlet in the cover.

2 Claims, 3 Drawing Sheets

QUANTITATIVE DISPENSER

CROSS-REFERENCES TO RELATED APPLICATIONS

This application is a continuation-in-part of application Ser. No. 08/328,193, filed Oct. 21, 1994, now abandoned.

BACKGROUND OF THE INVENTION

1. Field of the Invention

The present invention relates to a quantitative dispenser, and in particular, to a quantitative dispenser which comprises a divider a with scale or scale-like means that is adapted to dispense a constant amount of powdery material such as powdered milk stored in a volumetric body.

2. Description of the Prior Art

There are many powdery or grain-type materials in our daily lives, for example, powder detergent, nourishing drug pills, healthy medicines, powdered milk, and the like, each of which has to be administrated or used at its own specified dosage. Each powder thereby needs its own measuring means, i.e., cup, spoon or the like for dispensing the powder from its container. These measuring means thus have various sizes depending on the kind of products and various serving conditions, and hence most of them cannot be used in common. This results in production of a lot of garbage at the end of their use, which is a waste of natural resources. In addition, big cans containing a large volume of powdery material are inconvenient to carry. This often causes trouble for their users, such as the use of many small cans or removing fractions with paper or the like.

As an example, currently, there is a powdered milk box which consists of 3 or 4 cylindrical compartments for containing powdered milk. These compartments are engaged with each other through screw threads. At the top of the box, there is a funnel with a screw cap on its central outlet. That funnel can be engaged with each compartment through, again, the screw thread. When dispensing, a screw cap on the outlet of the funnel and turning the box upside down, allows powdered milk in the first compartment to be poured into a milk bottle or the like.

However, there are several disadvantages for this kind of dispensing box: for example, a certain amount of powdered milk has to be loaded in each compartment before dispensing. The amount of powdered milk can not be varied according to different situations so that the amount of milk dispensed may be too much or too little. Also, the number of usages for the container is limited to the number of compartments.

Accordingly, there exists a need to provide a more economically efficient and more convenient quantitative dispenser in order to overcome the disadvantages of the prior art.

Accordingly, the objects and advantages of the invention can be achieved by providing a quantitative dispenser which will be described hereinafter in detail with reference to its preferred embodiment.

SUMMARY OF THE INVENTION

The main purpose of this invention is to provide a quantitative dispenser that is convenient to use by hand and is easy to carry. The container must consistently dispense powders as well as have an aesthetic cylindrical configuration. The dispenser has a volumetric cover and a measuring space in said cover.

Another purpose of this invention is to provide the above-described quantitative dispenser which can store powder material such as powdered milk in a body and remove the contents by opening a sealing cap on an outlet without using any spoon or lifting the entire cover of the dispenser. This reduces contact of the powdered milk with the air and hands. Such a quantitative dispenser is easy to carry and assemble, and it can dispense a pre-determined amount of drug powder or pills directly into the mouth of a user.

Still another purpose of this invention is to provide the above-described quantitative dispenser, which comprises further a scale divider consisting of a sleeve part and a wing part in an integral configuration. Said sleeve part is slipped on and rotates around a hollow engaging shaft at the center inside of the cover. Said wing part can, upon rotation of the sleeve part, be fixed with its upper side fixed on the inner periphery of the cover so as to accomplish the function of quantitative setting such that different constant amounts of material can be dispensed upon changing the position of the wing part of the scale divider.

A further purpose of this invention is to provide the above-described quantitative dispenser, which comprises further a scale on the outer surface of said cover to determine the desired amount of material to be dispensed.

Still a further purpose of this invention is to provide the above-described quantitative dispenser, which comprises a hollow engaging shaft at the central inside of the cover, wherein said cover is engaged with a separator plate by engaging the lower end of said hollow engaging shaft with an engaging hole at the center of said separator plate, such that, upon lifting the cover from the body, due to said separator plate having a flow-through opening on its periphery and being engaged in the inner annular slot of said cover so it can be lifted together with said body, fresh material can be introduced into said body.

Still a further purpose of this invention is to provide the above-described quantitative dispenser which uses an upward protruding control point provided at the side of said flow-through opening to push said scale divider in order to fix a desired amount so that quantitative adjusting can be achieved without lifting the cover so as to seal the flow-through opening on the separator plate with the bottom plate of said cover.

BRIEF DESCRIPTION OF THE DRAWINGS

The drawings disclose an illustrative embodiment of the present invention which serves to exemplify the various advantages and objects thereof, and are as follows.

DETAILED DESCRIPTION OF THE PREFERRED EMBODIMENT

Figure 1:
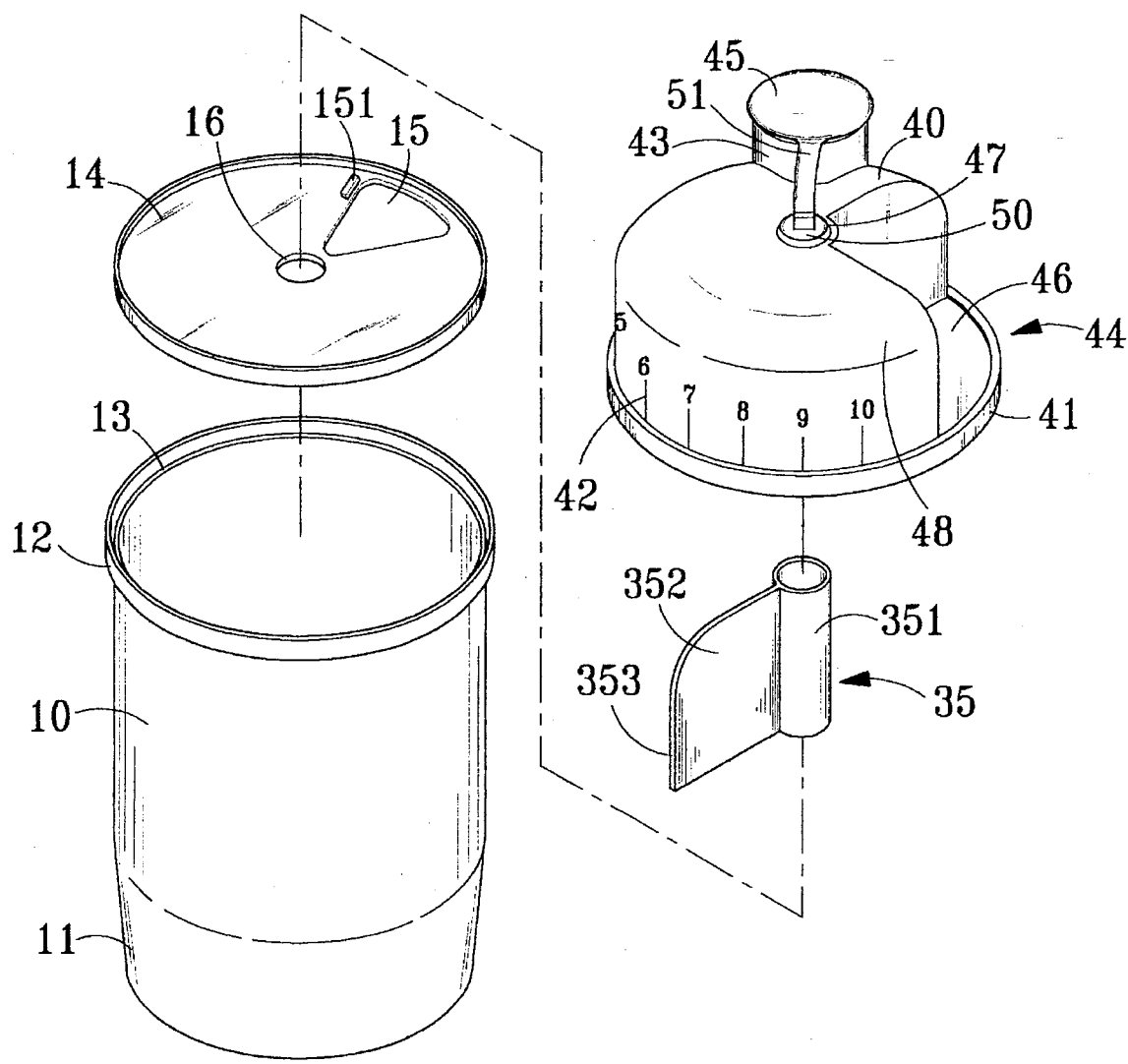
FIG. 1 is a perspective exploded view of the quantitative dispenser according to the present invention.
Figure 3:
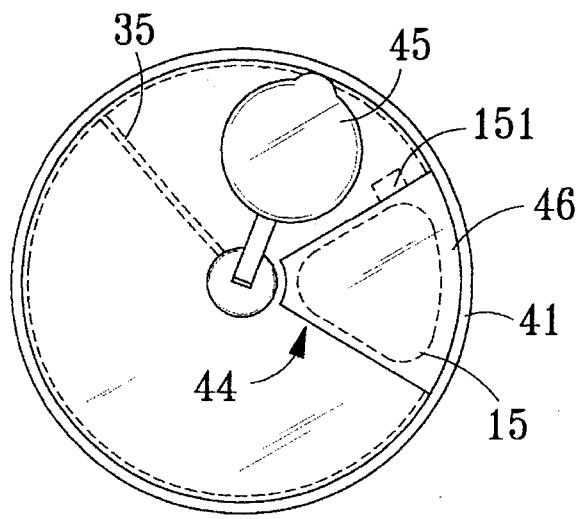
FIG. 3 is a top schematic illustration of the quantitative dispenser according to the present invention.
Figure 2:
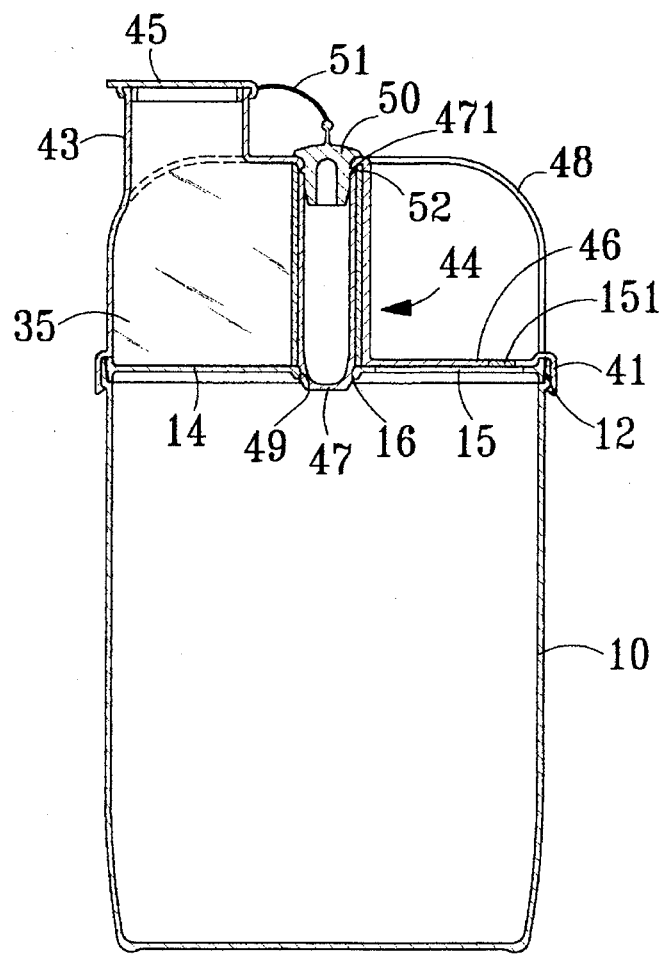
FIG. 2 is a cross-section view of the quantitative dispenser according to the present invention.

Now, refer to FIGS. 1 to 3, which show a preferred embodiment of the quantitative dispenser according to the present invention. The dispenser comprises a body 10 which has a cylindrical shape with a lower part 11 converging toward a bottom so as to give an aesthetic effect. The top of the body 10 comprises a stepwise inner annular slot 13 with a peripheral flange 12 protruding from the slot 13. A separator plate 14 is engaged in the slot 13, and has an engaging hole 16 at its center and a flow-through opening 15 at its periphery. A transparent or translucent cover 40, is engaged with the body 10 by covering the outside periphery of the flange 12 of the body 10 with the bottom edge 41 of the cover 40. The cover 40 comprises an arcuate upper surface 48 and a cut-out sector 44. The cut-out sector 44 covers one-sixth to one-fourth the circumference of the cover 40.

Said cut-out sector 44 has a bottom plate 46 which can seal the flow-through opening 15 on the separator plate 14 and two sidewalls which are an integral portion of the cover 40. A vertical hollow engaging shaft 47 extends from the center of the inner upper surface of the cover 40 downward toward the central engaging hole 16 of the separator plate 14. The engaging shaft 47 engages in a loose configuration with the central engaging hole 16 through an annular slot 49 at the lower end of said shaft. A cylindrical outlet 43 extends upward from the upper surface of the cover 40 at either side of the cut out sector 44.

A sealing cap 45 on the outlet 43 is connected with an annular plug 50 at the upper outer end of the engaging shaft 47 through a connection belt 51. Said annular plug 50 has an inverted U-shape and exhibits elasticity. The peripheral annular flange 52 of the plug 50 engages with the annular slot 471 along the inner periphery of the engaging shaft 47. On the surface of the cover 40 there are scale marks 42 to facilitate quantitative measuring. Inside the cover 40, a scale divider 35 has its sleeve part 351 slipped in a semi-loose configuration on the engaging shaft 47 while a side 353 of its wing part 352 is fixed loosely along the inner periphery of the cover 40.

The quantitative dispenser of the present invention can form a measuring space in the volumetric cover 40 between the wing part 352 of the scale divider 35 and a sidewall of the cut out sector 44 at the same side as outlet 43. A pre-storage space is formed in the body 40. When in use, powdered milk pre-stored in the pre-storage space passes through the flow-through opening 15 on the separator plate 14 into a measuring space in the cover 40. After quantitative measuring, the cover 40 is rotated such that the bottom plate 46 seals the flow-through opening 15. The material in the measuring space can then be poured out through the outlet 43 after opening the sealing cap 45 on the outlet 43.

In addition, as shown in FIG. 1, the quantitative dispenser of the invention comprises further a very small control point 151 protruding upward by the side of the flow-through opening 15 on the separator plate 14 at the same side as the outlet 43.

Figure 4:
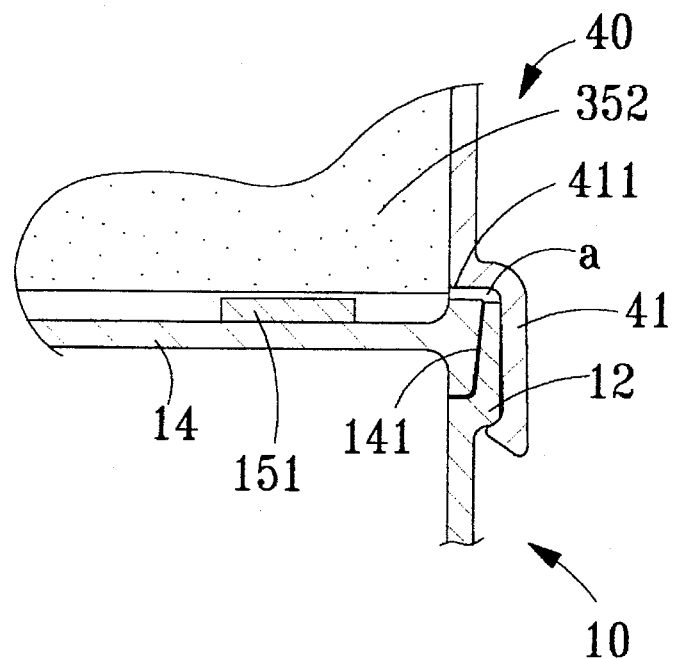
FIG. 4 is a fragmentary cross-section view showing the configuration of the quantitative dispenser when its cover is covered loosely on the body.
Figure 5:
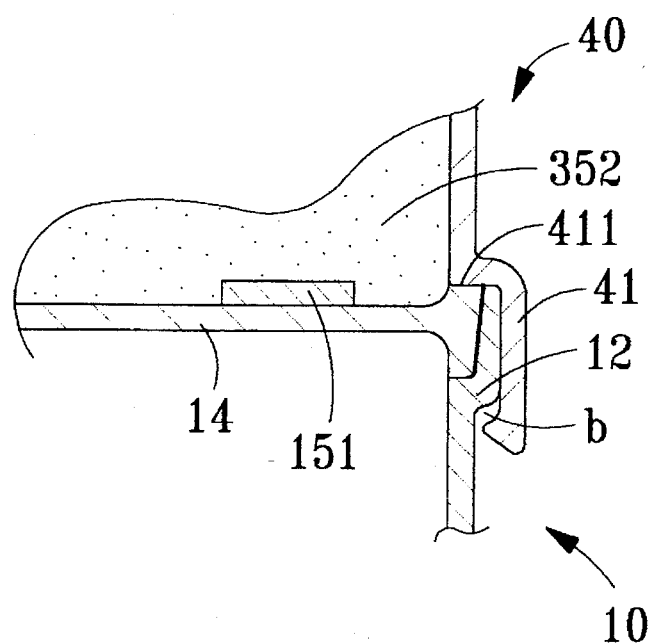
FIG. 5 is a fragmentary cross-section view showing the configuration of the quantitative dispenser when its cover is covered tightly on the body.

By rotating the separator plate 14 with the control point 151, the amount of material desired to be poured from the body 10 can be adjusted. For example, if ten spoonfuls of powdered milk can be poured into the measuring space inside the cover, then the whole space inside the cover 40 can be divided into 10 scales corresponding to 10 portions of material. While in a semi-loose configuration, slightly pressing the cover 40 downward converts it into a configuration of tightly covering and changes the gap position between the cover 40 and the body 10 from that shown in FIG. 4 to that shown in FIG. 5. The separator plate 14 is thus tightly engaged with the scale divider 35. Rotating the cover 40 until the control point 151 encounters the lower edge of the wing part 352 causes rotation of the wing part 352. Forward rotation can move back one scale, and reverse rotation moves ahead on the scale. In reverse rotation, the cover 40 is lifted upward which results in a loosely covering configuration as shown in FIG. 4 and which lets the control point 151 slide over gap a. Thereafter, pressing the cover 40 causes the control point 151 to push the wing part 352 of the scale divider 35. Subsequent to this adjusting, releasing the pressure on the cover 40 lets the cover 40 return automatically to the semi-loose configuration. Meanwhile, the scale divider 35 is fixed inside the cover 40. The friction force of scale divider 35 against the cover 40 is larger than that of the separator plate 14 against the body 10 so that the separator plate 14 will rotate together with the body 10 until it encounters the scale divider 35 where it then rotates together with the scale divider 35. Thus, the separator plate 14 can be opened and closed by being rotated and is incorporated with the action of the cut-out sector 44 on the bottom plate 46.

By using the structure as described above, a desired amount of power material can be adjusted and set at any moment without lifting the cover. The key to the friction-controlled operation is that the edge 141 of the separator plate 14 tilts downward and inward in a small angle so as to converge toward the inside center while, correspondingly, the inner annular slot 13 tilts downward and inward at the same angle to expand toward the inside center. This leads the turning 411 of the bottom edge 41 of the cover 40 to press the edge 141 of the separator plate 14 so that the scale divider 35 contacts closely with the separator plate 14. In the absence of said pressing, by holding the cover 40, the body 10 can rotate readily along with the separator plate 14.

The assembly of the quantitative dispenser of the present invention comprises putting the cover 40 upside down, placing the scale divider 35 in the cover 40 and intercalating the separator plate 14 to form an integral construction, and finally, covering the cover 40 onto the body 10. When material is put into the empty space in the body 10, the cover 10 is removed together with the separator plate 14 as an integral structure. Since each component of the quantitative dispenser of the invention can be made of plastic, the components can be disassembled and cleaned easily. Since the control point 151 is not very high such that the scale divider 35 is still able to rotate freely on the surface of the separator plate 14, it is only with hard pressing of the cover 40 that the control point 151 can regulate the adjusting of the quantity measured. Therefore, the cover 40 can rotate with the scale divider 35 and the separator plate 14 as a whole against the body 10, or the cover 40 can rotate together with only the scale divider 35 against the separator plate 14 on the body 10, according to the user's needs.

Accordingly, it will be understood from the above description with respect to the quantitative dispenser of the present invention that, by means of the special method for setting a constant amount of powder material according to the present invention, a pre-determined amount of the powder material pre-stored in a container can be poured out readily, hygienically, and conveniently. Therefore, the quantitative dispenser of the present invention is a practical novel structure.

However, many changes and modifications in the above-described embodiment of the invention can, of course, be carried out without departing from the scope thereof. Accordingly, to promote progress in science and the useful arts, the present invention as disclosed is intended to be limited only by the scope of the appended claims.

What is claimed is:

1. A quantitative dispenser comprising:

a cylindrical body with a lower part that converges to a bottom, an inner portion of a top end of said body comprises a stepwise annular slot, said slot includes a peripheral flange protruding from said slot, said annular slot angles downward and inward so as to converge toward an inside center of said body;

a separator plate engaged in said inner annular slot at the top of said cylindrical body, having an engaging hole at its center and a flow-through opening near its periphery; its edge angles downward and inward so as to converge toward said inside center of said body;

a volumetric cover with a bottom of said cover engaging said flange at said top end of said body, said cover comprises an outlet projecting vertically from a curved upper outer surface of said cover, a sealing cap on said outlet, a hollow engaging shaft extending from an inner center of said cover toward said central engaging hole, and an annular slot at a lower end of said hollow shaft, wherein said annular slot engages said engaging hole at the center of said separator plate and thereby engages said cover with said separator plate; an outer surface of said cover further comprises a scale and a numerical display;

a cut-out sector converging inwardly at a side of said cover, said cut-out sector comprising sealed sidewalls at each of two sides and a bottom plate in an integral construction with said cover, wherein said bottom plate seals said flow-through opening on said separator plate, and wherein said outlet is provided near one of said sides of said cut-out sector; and said sealing cap is connected with an annular plug via a connecting belt, wherein said annular plug is engages an outer upper end of said engaging shaft;

a scale divider, comprising a sleeve part and a wing part integral to each other, wherein said sleeve part slips on the outside of said hollow engaging shaft of said cover, and an upper peripheral profile of said wing part matches an arcuate undercut beneath an arcuate profile of said cover and a bottom edge of said wing part contacts the surface of said separator plate; wherein, said upper profile of said wing part can be fixed on an inside periphery of said cover, thereby, in combination with said sidewall of said cut-out sector forming a measuring space.

2. The quantitative dispenser of claim 1 wherein:

said quantitative dispenser further comprises a small upward protruding control point provided at a side of said flow-through opening on said separator plate and near a peripheral position at the same side as said outlet, such that when a user presses said cover, said control point moves said scale divider to provide quantitative measuring.

* * * * *